United States Patent [19]

Sakashita et al.

[11] Patent Number: 4,607,073

[45] Date of Patent: Aug. 19, 1986

[54] MOLDING POLYAMIDE COMPOSITION

[75] Inventors: Takeshi Sakashita, Iwakuni; Hidehiko Hashimoto; Takayuki Nakano, both of Otake, all of Japan

[73] Assignee: Mitsui Petrochemical Industries, Ltd., Tokyo, Japan

[21] Appl. No.: 699,399

[22] Filed: Feb. 7, 1985

[51] Int. Cl.[4] .......... C08L 77/00; C08K 3/36; C08K 3/34; C08K 3/10

[52] U.S. Cl. .......... 524/404; 524/406; 524/430; 524/494; 524/496; 524/606; 525/432

[58] Field of Search .......... 524/606, 607, 430, 406, 524/494, 496, 404; 525/178, 432; 528/339, 335

[56] References Cited

U.S. PATENT DOCUMENTS

| | | | |
|---|---|---|---|
| Re. 28,646 | 12/1975 | Hedrick et al. | 524/606 |
| 3,382,216 | 5/1968 | Blaschke et al. | 524/607 |
| 3,843,611 | 10/1974 | Campbell | 528/339 |
| 3,941,755 | 3/1976 | Chapman et al. | 524/607 |
| 4,476,280 | 10/1984 | Poppe et al. | 524/606 |
| 4,518,728 | 5/1985 | Pollard | 524/606 |

*Primary Examiner*—Lewis T. Jacobs
*Attorney, Agent, or Firm*—Wenderoth, Lind & Ponack

[57] ABSTRACT

Disclosed is a molding reinforced polyamide composition comprising [A] a polyamide selected from a polyamide composed of (a) aromatic dicarboxylic acid component units comprising 60 to 77 mole % of terephthalic acid component units and 23 to 40 mole % of aromatic dicarboxylic acid component units other than terephthalic acid component units and (b) 1,6-diaminohexane units and a polyamide composed of (a) aromatic dicarboxylic acid component units comprising 60 to 100 mole % of terephthalic acid component units and 0 to 40 mole % of aromatic dicarboxylic acid component units other than terephthalic acid component units and (b) units of a linear aliphatic alkylene-diamine component having 7 to 18 carbon atoms, and [B] a filler in an amount of 0.5 to 200 parts by weight per 100 parts by weight of said polyamide.

This composition has excellent heat resistance characteristics, mechanical properties, chemical and physical properties and molding characteristics in combination.

11 Claims, No Drawings

MOLDING POLYAMIDE COMPOSITION

BACKGROUND OF THE INVENTION (1) Field of the Invention

The present invention relates to a molding reinforced polyamide composition which is excellent in heat resistance characteristics, mechanical properties, chemical and physical properties and molding characteristics.

(2) Description of the Prior Art

Ordinarily, thermoplastic resins such as polyolefins, polyesters and polyamides can be applied to melt molding such as compression molding, injection molding or extrusion molding and they are excellent in the moldability. However, these resins are not satisfactory as engineering plastics in heat resistance characteristics, mechanical properties and chemical properties, but they are used in the general-purpose molding field while utilizing excellent characteristics of the respective resins. As means for improving heat resistance characteristics, mechanical properties or physical and chemical properties in thermoplastic resin, there have been proposed compositions formed by incorporating in these thermoplastic resins fillers such as glass powder, graphite powder, glass fiber and carbon fiber. The foregoing characteristics are considerably improved in these filler-incorporated reinforced thermoplastic resin compositions. However, the characteristics of these reinforced compositions are still lower than the levels required for high-performance engineering plastics, and as in case of the above-mentioned ordinary thermoplastic resins, these reinforced thermoplastic resin compositions are used only in the molding field where the characteristics of the respective resins are utilized.

As known engineering plastics excellent in heat resistance characteristics, mechanical properties and chemical and physical properties, there can be mentioned polytetrafluoroethylene (Teflon®), polyparaphenylene-terephthalamide (Keblar®), polyimide composed of a condensate of 4,4'-diaminodiphenyl ether with pyromellitic anhdyride (Kapton®), polyhexamethyleneadipoamide (6,6-nylon), poly-2,2,4-trimethylhexamethylene-terephthalamide (Trogamid®), polyphenylene-sulfide and polyacetal. Among these plastics, polytetrafluoroethylene, polyterephthaloylparaphenylene-diamine and the above-mentioned polyimide resin are excellent in heat resistance characteristics, mechanical properties and chemical and physical properties, but they are defective in that melt molding is impossible and therefore, the utilization field is extremely limited. Among the foregoing engineering plastics, polyphenylene-sulfide, polyhexamethyleneadipoamide (6,6-nylon), 2,2,4-trimethylhexamethylene-terephthalamide (Trogamid®) and polyacetal are characterized in that melt molding is possible. However, these plastics are insufficient in several points. More specifically, polyamides such as polyhexamethylene adipoamide (6,6-nylon) and poly-2,2,4-trimethylhexamethylene-terephthalamide (Trogamid®) are inferior in heat resistance characteristics such as the glass transition point and heat distortion temperature, mechanical properties such as the tensile strength, flexural strength and abrasion resistance and chemical and physical properties such as the chemical resistance, boiling water resistance and saturated water absorption, and polyacetal is inferior in heat resistance characteristics such as the melting point and heat distortion temperature and mechanical properties such as the flexural strength, impact strength and abrasion resistance.

SUMMARY OF THE INVENTION

We made research with a view to developing a molding resin composition excellent in all of heat resistance characteristics, mechanical properties, chemical and physical properties and molding characteristics, and as the result, it was found that this object can be attained by a reinforced polyamide composition comprising a specific polyamide composed of aromatic dicarboxylic acid component units including a specific amount of terephthalic acid component units and linear aliphatic alkylene-diamine component units and a filler in a specific amount relative to the polyamide. We have now completed the present invention based on this finding. A molding reinforced polyamide composition of the present invention is characterized in that the composition in is excellent in heat resistance characteristics such as the melting point, glass transition point and heat distortion temperature, mechanical properties such as the tensile strength, flexural strength, impact strength, dynamic friction coefficient and Taber abrasion, chemical and physical properties such as the chemical resistance, boiling water resistance and saturated water absorption, and molding characteristics such as the melt flowability, melt compression moldability, melt injection moldability and melt extrusion moldability.

In accordance with the present invention, there is provided a molding reinforced polyamide composition comprising [A] a polyamide selected from a polyamide composed of (a) aromatic dicarboxylic acid component units comprising 60 to 77 mole% of terephthalic acid component units and 23 to 40 mole% of aromatic dicarboxylic acid component units other than terephthalic acid component units and (b) 1,6-diaminohexane units and a polyamide composed of (a) aromatic dicarboxylic acid component units comprising 60 to 100 mole% of terephthalic acid component units and 0 to 40 mole% of aromatic dicarboxylic acid component units other than terephthalic acid component units and (b) units of a linear aliphatic alkylene-diamine component having 7 to 18 carbon atoms, and [B] a filler in an amount of 0.5 to 200 parts by weight per weight of said polyamide.

DETAILED DESCRIPTION OF THE INVENTION

The polyamide [A] incorporated as the resin component in the molding reinforced polyamide composition of the present invention is selected from a polyamide composed of (a) aromatic dicarboxylic acid component units comprising 60 to 77 mole% of terephthalic acid component units and 23 to 40 mole% of aromatic dicarboxylic acid components other than terephthalic acid component units and (b) 1,6-diaminohexane units and a polyamide composed of (a) aromatic dicarboxylic acid component units comprising 60 to 100 mole% of terephthalic acid component units and 0 to 40 mole% of aromatic dicarboxylic acid component units other than terephthalic acid component units and (b) units of a linear aliphatic alkylene-diamine component having 7 to 18 carbon atoms. The intrinsic viscosity ($\eta$) of the polyamide of this type is not particularly critical and a polyamide insoluble in concentrated sulfuric acid may be used, but it is preferred that the intrinsic viscosity ($\eta$) of the polyamide as measured in concentrated sulfuric acid be 0.5 to 3.0 dl/g, particularly 0.5 to 2.8 dl/g, especially particularly 0.6 to 2.5 dl/g.

As the aromatic dicarboxylic acid component units (a) constituting the polyamide [A] of the molding reinforced polyamide composition of the present invention, there can be mentioned units of terephthalic acid, isophthalic acid, phthalic acid, 2-methylterephthalic acid and naphthalene-dicarboxylic acid. In the case where the alkylene-diamine component (b) is 1,6-diaminohexane, in view of the heat moldability or the tensile strength, flexural strength or impact resistance of the final molded article, it is important that the aromatic dicarboxylic acid component units (a) should comprise 60 to 77 mole%, especially 65 to 75 mole%, of terephthalic acid component units and 23 to 40 mole%, especially 25 to 35 mole%, of aromatic dicarboxylic acid component units other than terephthalic acid component units. More specifically, if the content of the terephthalic acid component units in the polyamide exceeds 77 mole%, the melting point of the polyamide is increased and the difference between the thermal decomposition-initiating temperature and the melting point becomes small and is less than 30° C., with the result that at the heat molding of the composition, thermal deterioration of the polyamide is conspicuous and mechanical properties of the final molded article, such as the tensile strength, flexural strength and impact strength, are extremely degraded. On the other hand, if the content of the terephthalic acid component units in the polyamide is lower than 60 mole%, heat resistance characteristics such as the heat distortion temperature, mechanical properties such as the tensile strength and abrasion resistance, and chemical and physical properties such as the chemical resistance and water resistance are degraded in a molded article prepared from the polyamide composition.

In the present invention, by selecting the ratio between the terephthalic acid component units and other aromatic dicarboxylic acid component units within the above-mentioned range, the difference between the thermal decomposition-initiating temperature and the melting point can be maintained at a level of at least 30° C., preferably at least 35° C. Accordingly, even if a filler is incorporated into the polyamide, the heat moldability is prominently improved and thermal deterioration of the polyamide can be prevented at the heat molding, and heat resistance characteristics and mechanical properties such as the tensile strength, flexural strength and impact resistance can be highly improved in the final molded article.

In the case where the alkylene-diamine component (b) is a linear alkylene-diamine having 7 to 18 carbon atoms, if the aromatic dicarboxylic acid component units comprise 60 to 100 mole% of terephthalic acid component units, preferably 75 to 100 mole% of terephthalic acid component untis, and 0 to 40 mole% of other aromatic dicarboxylic acid component units, preferably 0 to 25 mole% of other aromatic dicarboxylic acid component units, heat resistance characteristics such as the heat distortion temperature, mechanical properties such as the flexural strength and abrasion resistance, and molding characteristics are improved, and especially good results can be obtained.

If the content of terephthalic acid component units is lower than 60 mole% or the content of aromatic dicarboxylic acid component units other than terephthalic acid component units is higher than 40 mole% in the aromatic dicarboxylic acid component units (a), heat resistance characteristics such as the heat distortion temperature, mechanical properties such as the tensile strength and abrasion resistance, and chemical and physical characteristics such as the chemical resistance and water resistance are degraded.

As the aromatic dicarboxylic acid component units other than terephthalic acid component units in the aromatic dicarboxylic acid components (a) constituting the polyamide, isophthalic acid component units and naphthale-dicarboxylic acid component units are preferred, and isophthalic acid component units are especially preferred. The aromatic dicarboxylic acid component units (a) constituting the polyamide comprises as the main components terephthalic acid component units and the above-mentioned aromatic dicarboxylic acid component units other than terephthalic acid component untis, but the aromatic dicarboxylic acid component units (a) may further comprise minor amounts of tribasic or higher polybasic carboxylic acid component units such as units of trimellitic acid or pyromellitic acid.

The linear aliphatic alkylene-diamine component units (b) constituting the polyamdie [A] of the molding reinforced polyamide composition of the present invention are units of a linear aliphatic alkylene-diamine having 6 to 18 carbon atoms, such as 1,6-diaminohexane, 1,7-diamino-heptane, 1,8-diamino-octane, 1,9-diaminononane, 1,10-diaminodecane, 1,11-diaminoundecane and 1,12-diaminododecane. Among these linear aliphatic alkylene-diamine component units, units of 1,6-diaminohexane, 1,8-diamino-octane, 1,10-diaminodecane, 1,12-diaminododecane or a mixture thereof are preferred as the units (b), and 1,6-diaminohexane or 1,10-diaminodecane component units are especially preferred.

In the present invention, a molding reinforced polyamide composition comprising as the polyamdie [A] a polyamide composed of (a) aromatic dicarboxylic acid component units comprising terephthalic acid component units and isophthalic acid component units and (b) units of 1,6-diaminohexane as the linear aliphatic alkylenediamine component units are especially preferred.

The above-mentioned polyamide [A] to be incorporated into the molding reinforced polyamide composition of the present invention can be prepared according to various known processes.

For example, as disclosed in Paul W. Morgan, Polymer Reviews, 10, Condensation Polymers by Interfacial and Solution Methods (published by Interscience Publishers in 1965) and Von H. Hopff and A. Krieger, Makromol. Chem., 47, 93–113 (1961), the polyamide may be prepared by polycondensing dihalides of aromatic dicarboxylic acids corresponding to the aromatic dicarboxylic acid component units (a) of the polyamide with a linear aliphatic alkylene-diamine corresponding to the linear aliphatic alkylene-diamine component units (b) according to the solution method or the interfacial method. Furthermore, the polyamide can be prepared by heating a nylon salt of aromatic dicarboxylic acids corresponding to the aromatic dicarboxylic acid component units (a) of the polyamide with a linear alkylenediamine corresponding to the linear aliphatic alkylene-diamine component units (b) to form an oligomer and subjecting the oligomer to the solid phase polymerization. Moreover, the nylon salt or oligomer may be melt-polymerized by an extruder or the like. In the present invention, a polyamide prepared according to any of the foregoing methods may be used, but a polyamide obtained by the solid phase polymerization of the oligomer is especially preferred.

As the filler [B] as the other component to be incorporated in the molding reinforced polyamide composition of the present invention, there can be used organic and inorganic compounds in the form of a powder, plate, fiber or cloth. More specifically, there can be mentioned powdery and plate-like inorganic compounds such as silica, alumina, silica-alumina, talc, diatomaceous earth, clay, kaolin, quartz, glass, mica, graphite, titanium dioxide, molybdenum disulfide, gypsum, red iron oxide, zinc oxide, aluminum, copper and stainless steel, fibrous inorganic compounds such as glass fiber, carbon fiber, boron fiber, ceramic fiber, asbestos fiber and stainless steel fiber, secondary processed products of these fibers such as cloth products, and powders, plates, fibers, clothes and their secondary processed products of wholly aromatic polyamides such as polyparaphenylene-terephthalamide, polymetaphenylene-terephthalamide, polyparaphenylene-isophthalamide, polymetaphenylene-isophthalamide, a condensate of diaminodiphenylether with terephthalic acid (isophthalic acid) and a condensate of p(m)-aminobenzoic acid, wholly aromatic polyamide-imides such as a condensate of diaminodiphenyl ether with trimellitic anhydride or pyromellitic anhydride, heterocyclic ring-containing compounds such as polybenzimidazole and polyimidazophenanthrene, and polytetrafluoroethylene. Moreover, mixtures of two or more of the foregoing fillers may be used. Fillers treated with a silane coupler or titanium coupler may be similarly used.

Among the foregoing fillers, silica, silica-alumina, titanium dioxide, graphite, molybdenum disulfide and polytetrafluoroethylene are preferably used as the powdery filler. When a powdery filler of graphite, molybdenum disulfide or polytetrafluoroethylene is used, the abrasion resistance characteristics such as the dynamic friction coefficient, Taber abrasion index and critical PV value are improved in a molded article prepared from the polyamide composition and good results can be obtained. If the average particle size of the powdery filler is in the range of from 0.1 m$\mu$ to 200$\mu$, preferably from 1 m$\mu$ to 100$\mu$, the above-mentioned abrasion resistance characteristics are especially improved. It is indispensable that the powdery filler should be incorporated in an amount of 0.5 to 200 parts by weight per 100 parts by weight of the polyamide, and it is preferred that the amount of the powdery filler be 0.5 to 100 parts by weight, especially 0.5 to 50 parts by weight, per 100 parts by weight of the polyamide.

Among the above-mentioned fillers, a wholly aromatic polyamide fiber such as a polyparaphenylene-terephthalamide fiber, a polymetaphenylene-terephthalamide fiber, a polyparaphenylene-isophthalamide fiber, a polymetaphenylene-isophthalamide fiber or a fiber obtained from a condensate of diaminodiphenyl ether with terephthalic acid or isophthalic acid is preferred as the organic fibrous filler, and if such a wholly aromatic polyamide fiber is used, mechanical properties such as the tensile strength and Izod impact strength and heat resistance characteristics such as the heat distortion temperature can be highly improved in a molded article obtained from the polyamide composition. Moreover, among the above-mentioned fillers, glass fiber, carbon fiber or boron fiber is preferred as the inorganic fibrous filler, and if such an inorganic fibrous filler is used, mechanical properties such as the tensile strength, flexural strength and flexural modulus, heat resistance characteristics such as the heat distortion temperature and chemical and physical properties such as the water resistance are highly improved in a molded article prepared from the polyamide composition. If the average length of the organic or inorganic fibrous filler is in the range of from 0.1 to 20 mm, especially from 1 to 10 mm, the moldability of the composition is improved and heat resistance characteristics such as the heat distortion temperature and mechanical properties such as the tensile strength and flexural strength are improved in a molded article prepared from the polyamide composition. It is indispensable that the organic or inorganic fibrous filler should be incorporated in an amount of 0.5 to 200 parts by weight per 100 parts by weight of the polyamide, and it is preferred that the amount of the fibrous filler be 5 to 180 parts by weight, especially 5 to 150 parts by weight, per 100 parts by weight of the polyamide.

If the amount incorporated of the above-mentioned powdery or fibrous filler exceeds 200 parts by weight per 100 parts by weight of the polyamide, the moldability of the polyamide composition and the pliability of a molded article obtained from the polyamide composition are drastically reduced.

The molding reinforced polyamide composition of the present invention comprises the above-mentioned polyamide [A] and filler [B] as the indispensable components. The composition of the present invention may consist solely of these indispensable components, or it may further comprise other components in addition to the indispensable components. As the third component to be added according to need, there can be mentioned, for example, known stabilizers, plasticizers, parting agents and lubricants.

As the method for preparing the molding reinforced polyamide composition of the present invention, there can be mentioned, for example, a method in which the filler is incorporated in the polyamide comprising the above-mentioned components while it is maintained in the molten state. As the melt-kneading and incorporating method, there can be mentioned, for example, a kneading method using an extruder or kneader.

The molding reinforced polyamide composition of the present invention can be molded by ordinary melt molding such as compression molding, injection molding or extrusion molding.

The composition of the present invention has an excellent heat moldability, and since a molded article formed from the composition of the present invention excellent in heat resistance characteristics, mechanical properties and chemical and physical properties, the molded article can be valuably used as various structural materials, machine parts and sliding members.

The present invention will now be described in detail with reference to the following examples. The synthesis of polyamides used in the examples and comparative examples is illustrated in Referential Examples 1 through 10. Moreoever, the preparation of reinforced resin compositions, the preparation of test pieces from the reinforced resin compositions and the evaluation of various properties are illustrated in these referential examples.

Incidentally, abbreviations used in Tables given hereinafter indicate the following compounds.

TA: terephthalic acid

IA: isophthalic acid $C_6DA$: 1,6-diaminohexane $C_8DA$: 1,8-diamino-octane
$C_{10}DA$: 1,10-diaminodecane

[I] PREPARATION OF POLYAMIDES

Referential Example 1

A 4-neck 10-liter flask equipped with a stirring rod, a thermometer and a reflux cooler was charged with 116 g (1 mole) of 1,6-diaminohexane, 220 g (2.1 moles) of sodium carbonate, 20 g of sodium lauryl sulfate and 5 l of deionized water, and the charge ws stirred at 5° C. in an $N_2$ atmosphere. Then, a solution of 152 g (0.75 mole) of terephthaloyl chloride and 51 g (0.25 mole) of isophthaloyl chloride in 4 l of chloroform was dropped into the mixture over a period of 10 minutes. After the dropwise addition, reaction was carried out at 5° C. for 15 minutes, and the reaction mixture was thrown into 40 l of acetone. The precipitated polymer was collected by suction filtering using a glass filter. The polymer was washed with warm water and then with acetone, and the polymer was dried at 100° C. under 100 mmHg for 1 day in a vacuum oven to obtain 234 g of an intended polymer (the yield was 95%). The content of the terephthalic acid component untis in the dicarboxylic acid component units of the polymer and the intrinsic viscosity ($\eta$) and melting point of the polymer are shown in Table 1.

Referential Examples 2 and 3

Polymers differing in the content of the terephthalic acid component units in the dicarboxylic acid component units were prepared in the same manner as described in Referential Example 1 except that the amounts used of terephthaloyl chloride and isophthaloyl chloride were changed as shown in Table 1. The obtained results are shown in Table 1.

TABLE 1

| | Referential Example 1 | Referential Example 2 | Referential Example 3 |
|---|---|---|---|
| Starting Materials | | | |
| Amount (g) of terephthaloyl chloride | 152 | 135 | 101 |
| Amount (g) of isophthaloyl chloride | 51 | 68 | 102 |
| Ratio (mole %) of terephthaloyl chloride in dicarboxylic dihalide component | 75 | 67 | 50 |
| Polymer | | | |
| Yield (%) | 95 | 90 | 91 |
| Content (mole %) of TA component units in dicarboxylic acid component units | 74 | 66 | 48 |
| (dl/g; 30° C. in conc. $H_2SO_4$) | 0.89 | 1.04 | 0.93 |
| Melting point (°C.) | 315 | 308 | 285 |
| Physical Properties | | | |
| Tensile strength (Kg/cm$^2$; 23° C.) | 700 | 710 | 680 |
| Tensile elongation (%) | 3.5 | 4.0 | 5.0 |
| Flexural strength (Kg/cm$^2$; 23° C.) | 1350 | 1100 | 980 |
| Flexural modulus ($\times 10^4$ Kg/cm$^2$; 23° C.) | 4.0 | 3.5 | 2.8 |
| Izod impact strength (Kg · cm/cm; 23° C.) | 3.0 | 5.0 | 8.0 |
| Critical PV value (Kg/cm$^2$ · m/sec) | 3.4 | 3.2 | 1.0 |
| Saturated water absorption (%; boiling water) | 3.0 | 3.5 | 5.8 |
| Hue | white | white | colorless transparent |
| Smelling and bubbling at molding | not caused | not caused | not caused |
| Thermal decomposition-initiating temperature (°C.)* | 362 | 360 | 360 |
| Thermal stability at molding** | 47 | 50 | 75 |

Note
*TGA analysis: temperature-elevating ratio of 10° C./min in $N_2$
**thermal decomposition-initiating temperature - melting point

Referential Example 4

A 3-liter flask was charged with 291 g (2.50 moles) of 1,6-diaminohexane, 340 g (1.75 moles) of dimethyl terephthalate, 146 g (0.75 mole) of dimethyl isophthalate and 0.6 l of deionized water, and the bath temperature was elevated to 95° C. and reaction was carried out in an $N_2$ atmosphere while the formed methanol was refluxed for 5 hours. Then, the bath temperature was elevated to 140° C. and methanol and water were distilled over a period of 4 hours. Then, the bath temperature was elevated from 140° C. to 350° C. at the constant rate over a period of 6 hours to remove the distillate and obtain 590 g of a low condensate having an intrinsic viscosity ($\eta$) of 0.6 dl/g as measured in concentrated sulfuric acid at 30° C. The melting point and intrinsic viscosity ($\eta$) of the low condensate are shown in Table 2.

Then, this low condensate was subjected to solid phase polymerization at 300° C. under 0.7 mmHg with stirring to obtain 570 g of a polyamide having an intrinsic viscosity ($\eta$) of 1.45 dl/g as measured in concentrated sulfuric acid at 30° C. During the solid phase polymerization, the temperature was always maintained at a level lower by 15° to 40° C. than the melting point of the polycondensation reaction mixture.

Referential Examples 5 thorugh 8

Polymers differing in the content of terephthalic acid component units in the dicarboxylic acid component units were prepared in the same manner as described in Referential Example 4 except that the amounts used of dimethyl terephthalate and dimethyl isophthalate and the solid phase polymerization conditions were changed as shown in Table 2. The obtained results are shown in Table 2.

TABLE 2

| | Referential Example No. | | | |
|---|---|---|---|---|
| | 5 | 6 | 7 | 8 |
| TA/IA (molar ratio) | 70/30 | 75/25 | 80/20 | 85/15 |
| ($\eta$) (in concentrated sulfuric acid at 30° C.) | 1.41 | 1.40 | 1.36 | 1.40 |
| Melting point (°C.) | 330 | 335 | 342 | 357 |
| Glass transition temperature (°C.) | 136 | 137 | 141 | 143 |
| Tensile strength (kg/cm$^2$) | 700 | 640 | 480 | 410 |
| Tensile elongation (%) | 3.0 | 2.4 | 1.2 | 0.5 |
| Flexural strength (kg/cm$^2$) | 1710 | 1550 | 1050 | 800 |
| Flexural modulus ($\times 10^4$ kg/cm$^2$) | 4.2 | 5.6 | 5.8 | 6.0 |
| Izod impact strength (kg · cm/cm) | 3.0 | 2.8 | 1.2 | 0.5 |
| Heat distortion temperature (°C.) | 140 | 141 | 141 | 142 |
| Taber abrasion (Δmg) | 14 | 17 | 25 | 35 |
| Dynamic friction coefficient | 0.24 | 0.23 | 0.23 | 0.22 |
| Critical PV value (kg/cm$^2$ · m/sec) | 3.4 | 3.5 | 3.5 | 3.6 |
| Saturated water | 1.2 | 1.1 | 1.1 | 1.0 |

TABLE 2-continued

| | Referential Example No. | | | |
|---|---|---|---|---|
| | 5 | 6 | 7 | 8 |
| absorption (%) | | | | |
| Hue | white | light yellow | yellow | yellow |
| Smelling and bubbling at molding | not caused | not caused | not caused | amine smell, slight bubbling |
| Thermal decomposition-initiating temperature (°C.)* | 372 | 370 | 370 | 369 |
| Thermal stability at molding** | 42 | 35 | 28 | 12 |

Note
*TGA analysis: temperature-elevating speed of 10° C./min in $N_2$
**thermal decomposition-initiating temperature - melting point Referential Example 9

A 4-neck flask equipped with a stirring rod, a thermometer and a reflux cooler was charged with 81 g (0.56 mole) of 1,8-diamino-octane, 47 g (1.18 moles) of sodium hydroxide, 11 g of sodium lauryl sulfate, 2.25 l of chloroform and 5.6 l of deionized water, and the charge was stirred at 10° C. in an $N_2$ atmosphere. Then, a solution of 91 g (0.45 mole) of terephthaloyl chloride and 23 g (0.11 mole) of isophthaloyl chloride in 3 l of chloroform was dropped into the mixture over a period of 7 minutes and reaction was carried out at 10° C. for 20 minutes. The reaction mixture was thrown into 30 l of acetone, and the precipitated polymer was recovered by suction filtering using a glass filter. The polymer was washed with acetone, with warm water and then with acetone and dried at 100° C. under 100 mmHg for 1 day in a vacuum oven to obtain 144 g of an intended polymer (the yield was 93%). The content of TA component units in the dicarboxylic acid component untis in the polymer was 78 mole%, and the intrinsic viscosity ($\eta$) of the polymer was 0.82 dl/g as measured in concentrated $H_2SO_4$ at 30° C. and the melting point of the polymer was 310° C.

Referential Example 10

A 10-liter reaction vessel equipped with a stirring rod, a thermometer and a reflux cooler was charged with 232 g (1.40 moles) of terephthalic acid, 241 g (1.4 moles) of 1,10-diaminodecane and 10 l of deionized water, and reaction was carried out at 95° to 100° C. for 1 hour. The obtained transparent solution was air-cooled, and the precipitated nylon salt was collected by suction filtering and dried at 100° C. under 100 mmHg to obtain 450 g of a nylon salt of terephthalic acid/1,10-diaminodecane (the yield was 95%). A 1-liter reaction vessel was charged with 450 g (1.33 moles) of this nylon salt, and after the pressure had been reduced to 1 mmHg, an $N_2$ current was introduced into the reaction vessel to substitute the inner atmosphere with $N_2$, and reaction was carried out at 310° C. in an $N_2$ current for 1.5 hours while expelling the formed water from the reaction system, to obtain 390 g of a polyamide composed of terephthalic acid and 1,10-diaminodecane, which had an intrinsic viscosity ($\eta$) of 0.72 dl/g as measured in concentrated $H_2SO_4$ at 30° C. (the yield was 97%). The polyamide was pulverized by a crusher so that the formed particles could pass through a 32-mesh sieve. The particles were dried at 100° C. under 1 mmHg for 12 hours and subjected to solid phase polyemrization at 295° C. under 0.7 mmHg for 12 hours to obtain 370 g of a polyamdie having an intrinsic viscosity ($\eta$) of 1.25 dl/g as measured in concentrated $H_2SO_4$ at 30° C. and consisting of terephthalic acid component units and 1,10-diaminodecane component units (the yield was 96%). The melting point of the polyamide was 316° C.

The results obtained in Referential Examples 9 and 10 are shown in Table 3.

TABLE 3

| | Referential Example 9 | Referential Example 10 |
|---|---|---|
| Polyamide | | |
| Dicarboxylic acid component units | TA,IA | TA |
| Content (mole %) of TA component units in dicarboxylic acid component units | 78 | 100 |
| Diamine component units | $C_8DA$ | $C_{10}DA$ |
| Melting point (°C.) | 310 | 316 |
| ($\eta$) (dl/g, 30° C. in conc. $H_2SO_4$) | 0.82 | 1.25 |
| Physical Properties | | |
| Tensile strength (kg/cm$^2$, 23° C.) | 800 | 850 |
| Flexural strength (kg/cm$^2$, 23° C.) | 1400 | 1300 |
| Flexural modulus (× $10^4$ kg/cm$^2$, 23° C.) | 4.3 | 3.8 |
| Izod impact strength (kg · cm/cm, 23° C.) | 5.0 | 7.0 |
| Heat distortion temperature (°C.) | 137 | 171 |
| Taber abrasion (Δmg) | 13 | 6 |
| Dynamic friction coefficient | 0.38 | 0.40 |
| Critical PV value (kg/cm$^2$ · m/sec) | 2.2 | 1.8 |
| Saturated water absorption (%) | 1.2 | 0.9 |

[II] PREPARATION OF REINFORCED RESIN COMPOSITIONS

The polyamides synthesized by the interfacial polyemrization were pulverized by a crusher so that the formed particles could pass through a 32-mesh sieve, the pulverized polyamdies were dried at 100° C. under 1 mmHg for 12 hours, and the dried polyamdies were used for the preparation of reinforced resin compositions. The polyamides prepared by the solid phase polymerization were used for the preparation of reinforced resin compositions as they were. A predetermined amount of a sufficiently dried filler was dry-blended with a predetermined amount of the polyamide in a nitrogen atmosphere. The mixture was melt-kneaded at predetermined temperature and pressure at a screw rotation number of 30 rpm in a nitrogen atmosphere by using a 20-mm vent extruder (the L/D ratio of the screw was 28) to obtain a strand. The strand was cut into a length of 0.8 to 1 cm to obtain a filler-reinforced resin composition.

[III] PREPARATION OF TEST PIECES AND EVALUATION OF PROPERTIES

A filler-reinforced resin composition was dried at 100° C. under 1 mmHg for 12 hours and hot-pressed under a pressure of 100 kg/cm$^2$ at a temperature higher by 20° C. than the melting point in a nitrogen atmosphere to obtain a compression-molded plate having a thickness of 2 to 10 mm. The molded plate was cut into a test piece having dimensions shown in Table 4, allowed to stand still in an atmosphere maintained at a temperature of 23° C. and a relative humidity of 65% for 96 hours and then subjected to the test.

TABLE 4

| Test | Test method | Dimensions (mm) of Test Piece |
|---|---|---|
| Tensile strength | ASTM D-638 | type 4, 115 × 19 × 4 |
| Flexural strength | ASTM D-790 | 63.5 × 12.7 × 2.0 |
| Flexural modulus | ASTM D-790 | 63.5 × 12.7 × 2.0 |

TABLE 4-continued

| Test | Test method | Dimensions (mm) of Test Piece |
|---|---|---|
| Izod impact strength | ASTM D-256 (notched) | 63.5 × 12.7 × 4.0 |
| Heat distortion temperature | ASTM D-648 (under load of 18.6 kg/cm$^2$) | 127 × 12.7 × 4.0 |
| Taber abrasion | ASTM D-1044, CS-17, 1 kg, 1000 rpm | 120 (diameter) × 2.0 |
| Dynamic friction coefficient | ASTM D-1894 (to steel) | 25.6 (outer diamter), 20 (inner diameter), 10 (height) |
| Water absorption | ASTM D-570, boiling water, 1 week | type 4, 115 × 19 × 4 |

EXAMPLE 1

A glass fiber-reinforced polyamide composition comprising 100 parts by weight of the polyamide described in Referential Example 1 and 43 parts by weight of a glass fiber having an average length of 6 mm (Chip Strand CS 6PE-231 supplied by Nitto Boseki K.K.) was prepared under conditions described in Table 5. The properties of test pieces prepared by using this composition are shown in Table 5.

EXAMPLE 2

A glass fiber-reinforced polyamide composition was prepared in the same manner as described in Example 1 except that a polyamide shown in Table 5 was used instead of the polyamide described in Referential Example 1 and the extrusion was carried out under conditions shown in Table 5. The properties of test pieces prepared by using the composition are shown in Table 5.

EXAMPLE 3

A carbon fiber-reinforced polyamide composition comprising 100 parts by weight of a polyamide described in Table 5 and a carbon fiber having an average length of 3 or 6 mm (TOO8A supplied by Toray K.K.) in an amount shown in Table 5 was prepared by extrusion under conditions shown in Table 5. The properties of test pieces prepared from the composition are shown in Table 5.

Comparative Example 1

A glass fiber-reinforced polyamide composition comprisng 100 parts by weight of the polyamdie described in Referential Example 3 and 43 parts by weight of a glass fiber having an average length of 6 mm (Chip Strand CS 6PE-231 supplied by Nitto Boseki K.K.) was prepared by extrusion under conditions described in Table 5. The properties of test pieces prepared by using the composition are shown in Table 5.

Comparative Example 2

A polyamide composed of 2,2,4-trimethylhexamethylenediamine component units and terephthalic acid component units (Trogamid T supplied by Dynamit Nobel Sales Corp.) dried at 100° C. under 1 mmHg for 12 hours was hot-pressed at 275° C. under 100 kg/cm$^2$ in a nitrogen atmosphere and then cold-pressed at 20° C. to form test pieces. The obtained results are shown in Table 5.

Comparative Example 3

A glass fiber-reinforced polyphenylene-sulfide composition (comprising 40% of glass fiber, Hyton R-4 supplied by Phillips Co.) dried at 100° C. under 1 mmHg for 12 hours was hot-pressed at 330° C. under 100 kg/cm$^2$ and then cold-pressed at 20° C. to form test pieces. The obtained results are shown in Table 5.

Comparative Example 4

A glass fiber-reinforced polyacetal composition (comprising 25% of glass fiber, Duracon GC-25 supplied by Polyplastics Co.) dried at 100° C. under 1 mmHg for 12 hours was hot-pressed at 200° C. under a pressure of 100 kg/cm$^2$ in a nitrogen atmosphere and then cold-pressed at 20° C. to from test pieces. The obtained results are shown in Table 5.

TABLE 5

| | Example 1 | Example 2 | Example 3 | Comparative Example 1 | Comparative Example 2 | Comparative Example 3 | Comparative Example 4 |
|---|---|---|---|---|---|---|---|
| Referential Example No. for Production of Polyamide | 1 | 2 | 1 | 3 | | | |
| Fibrous Inorganic filler-Reinforced Resin Composition Polyamide | | | | | | | |
| dicarboxylic acid component units | TA, IA | TA, IA | TA, IA | TA, IA | Trogamid T supplied by Dynamit Nobel Sales Corp. | polyphenylenesulfide, Hyton R-4 supplied by Phillips Co. | polyacetal, Duracon GC-25 supplied by Polyplastics Co. |
| content (mole %) of TA components units in dicarboxylic acid component units | 74 | 66 | 74 | 48 | | | |
| diamine component units | $C_6DA$ | $C_6DA$ | $C_6DA$ | $C_6DA$ | | | |
| (η) (dl/g) | 0.89 | 1.04 | 0.89 | 0.93 | | | |
| Filler | | | | | | | |
| kind | glass fiber | glass fiber | carbon fiber | glass fiber | — | glass fiber | glass fiber |
| average length (mm) | 6 | 6 | 6 | 6 | — | | |
| amount (parts by weight/100 parts by weight of polyamide) | 43 | 43 | 43 | 43 | 0 | 67 | 33 |
| Melting-Kneading Conditions | | | | | | | |
| temperature (°C.) | 280–350 | 280–350 | 280–350 | 260–325 | — | — | — |
| pressure (kg/cm$^2$) | 20 | 20 | 20 | | — | — | — |
| Physical Properties | | | | | | | |
| tensile strength (kg/cm$^2$, 23° C.) | 810 | 880 | 800 | 810 | 680 | 710 | 650 |
| flexural strength (kg/cm$^2$, 23° C.) | 1350 | 1580 | 1580 | 1010 | 1100 | 1250 | 720 |
| flexural modulus (× $10^4$ kg/cm$^2$, 23° C.) | 4.8 | 4.5 | 4.6 | 3.0 | 2.9 | 4.5 | 2.9 |
| Izod impact strength (kg · cm/cm, 23° C.) | 7.2 | 8.4 | 9.5 | 8.0 | 11.5 | 5.5 | 4.3 |
| melting point (°C.) | 317 | 310 | 317 | 285 | — | 290 | 181 |
| heat distortion temperature (°C.) | >250 | >250 | >250 | 123 | 121 | 238 | 157 |
| flexural strength retention | 65 | 63 | 65 | 5 | 5 | 50 | ~0 |

TABLE 5-continued

| | Example 1 | Example 2 | Example 3 | Comparative Example 1 | Comparative Example 2 | Comparative Example 3 | Comparative Example 4 |
|---|---|---|---|---|---|---|---|
| ratio* (%, 200° C.) | | | | | | | |
| Taber abrasion (Δmg) | 21 | 19 | 18 | 13 | 9 | 89 | 41 |
| dynamic friction coefficient | 0.57 | 0.54 | 0.50 | 0.72 | 0.65 | 0.70 | 0.60 |
| saturated water absorption (%, boiling water) | 1.8 | 2.0 | 1.6 | 2.6 | 6.2 | 0.5 | 1.3 |
| tensile strength retention ratio in saturated water absorption state (boiling water)** (%, 23° C.) | 86 | 84 | 88 | 72 | 61 | 93 | 68 |

Note
*percentage to the flexural strength at 23° C.
**percentage to the tensile strength at 23° C.

EXAMPLES 4 THROUGH 6

A polyamide composition was prepared in the same manner as described in Example 1 except that a filler shown in Table 6 was used in an amount shown in Table 6 instead of the glass fiber used in Example 1. The properties of test pieces prepared by using the composition are shown in Table 6.

TABLE 6

| Filler | Example 4 | Example 5 | Example 6 |
|---|---|---|---|
| Kind | graphite | graphite | molybdenum disulfide |
| Average particle size (μ) | 35 | 35 | 20 |
| Mixing ratio (parts by weight/100 parts by weight) | 5 | 10 | 2 |
| Physical Properties | | | |
| Taber abrasion (Δmg) | 4 | 5 | 4 |
| Dynamic friction coefficient | 0.30 | 0.26 | 0.25 |

EXAMPLE 7

A glass fiber-reinforced polyamide composition comprising 100 parts by weight of the polyamide described in Referential Example 5 and 82 parts by weight of the glass fiber described in Example 1 was prepared by extrusion under the same conditions as described in Example 1. The properties of test pieces prepared by using this composition are shown in Table 7.

EXAMPLE 8

A glass fiber-reinforced polyamide composition was prepared in the same manner as described in Example 7 except that the polyamide described in Referential Example 6 was used. The properties of test pieces prepared from this composition are shown in Table 7.

Comparative Example 5

A glass fiber-reinforced polyamide composition was prepared in the same manner as described in Example 7 except that the polyamide described in Referential Example 7 was used. The properties of test pieces prepared from this composition are shown in Table 7.

Comparative Examples 6 and 7

A glass fiber-reinforced polyamide composition was prepared in the same manner as described in Example 7 except that the polyamide described in Referential Example 8 was used and the amount incorporated of the glass fiber was changed as shown in Table 7. The properties of test pieces are shown in Table 7.

TABLE 7

| | Example 7 | Example 8 | Comparative Example 5 | Comparative Example 6 | Comparative Example 7 |
|---|---|---|---|---|---|
| TA/IA molar ratio | 70/30 | 75/25 | 80/20 | 85/15 | 85/15 |
| (η) (in concentrated sulfuric acid at 30° C.) | 1.41 | 1.40 | 1.36 | 1.40 | 1.40 |
| Melting point (°C.) | 330 | 335 | 342 | 357 | 357 |
| Glass transition point (°C.) | 136 | 137 | 141 | 143 | 143 |
| Polyamide/glass fiber weight ratio | 100/82 | 100/82 | 100/82 | 100/82 | 100/67 |
| Tensile strength (kg/cm$^2$) | 2400 | 2250 | 1050 | 630 | 610 |
| Flexural strength (kg/cm$^2$) | 3200 | 2650 | 1750 | 980 | 950 |
| Flexural modulus (× $10^4$ kg/cm$^2$) | 12.9 | 13.2 | 14.5 | 14.7 | 14.0 |
| Heat distortion temperature (°C.) | >265 | >265 | >265 | >265 | >265 |
| Izod impact strength (kg · cm/cm) | 10.5 | 9.2 | 5.5 | 3.0 | 2.7 |

EXAMPLES 9 THROUGH 17 AND COMPARATIVE EXAMPLE 8

Compositions comprising 100 parts by weight of the polaymid described in Referential Example 9 or 10 and a glass fiber having an average weight of 6 mm (Chip Strand CS 6PE-231 supplied by Nitto Boseki K.K.), a glass fiber having an average length of 3 mm (Chip Strand CS 3PE-231 supplied by Nitto Boseki K.K.), a carbon fiber having an average length of 3 or 6 mm (TOO8A supplied by Toray K.K.) or a polyparaphenylene-terephthalamide fiber having an average length of 3 mm (Keblar ®49 supplied by Du Pont Co.) in an amount shown in Table 8 were prepared in the same manner as described in Example 1. The properties of test pieces prepared from these compositions are shown in Table 8.

TABLE 8

| | Example 9 | Example 10 | Example 11 | Example 12 | Example 13 | Example 14 | Example 15 | Example 16 | Example 17 | Comparative Example 8 |
|---|---|---|---|---|---|---|---|---|---|---|
| Referential Example No. for Production of Polyamide | 9 | 10 | 10 | 10 | 10 | 10 | 10 | 10 | 10 | 10 |
| Fibrous Inorganic filler-Reinforced Resin Composition Polyamide | | | | | | | | | | |
| dicarboxylic acid component units | TA, IA | TA | TA | TA | TA | TA | TA | TA | TA | TA |
| content (mole %) of TA component units in dicarboxylic acid component units | 78 | 100 | 100 | 100 | 100 | 100 | 100 | 100 | 100 | 100 |
| diamine component units | $C_8DA$ | $C_{10}DA$ | $C_{10}DA$ | $C_{10}DA$ | $C_{10}DA$ | $C_{10}DA$ | $C_{10}DA$ | $C_{10}DA$ | $C_{10}DA$ | $C_{10}DA$ |
| ($\eta$) (dl/g) | 0.82 | 1.25 | 1.25 | 1.25 | 1.25 | 1.25 | 1.25 | 1.25 | 1.25 | 1.25 |
| Filler | | | | | | | | | | |
| kind | glass fiber | glass fiber | glass fiber | glass fiber | glass fiber | carbon fiber | carbon fiber | carbon fiber | polyparaphenylene-terephthalamide fiber | — |
| average length (mm) | 6 | 6 | 3 | 6 | 6 | 6 | 6 | 3 | 3 | — |
| amount (parts by weight/100 parts by weight of polyamide) | 43 | 43 | 43 | 18 | 100 | 18 | 43 | 43 | 18 | 0 |
| Melting-Kneading Conditions | | | | | | | | | | |
| Temperature (°C.) | 280-350 | 280-350 | 280-350 | 280-350 | 280-350 | 280-350 | 280-350 | 280-350 | 280-350 | 280-340 |
| pressure (kg/cm$^2$) | 20 | 20 | 20 | 5 | 35 | 5 | 20 | 20 | 20 | 5 |
| Physical Properties | | | | | | | | | | |
| tensile strength (kg/cm$^2$, 23° C.) | 890 | 1100 | 1050 | 950 | 1200 | 940 | 1050 | 1020 | 1010 | 850 |
| flexural strength (kg/cm$^2$, 23° C.) | 1690 | 1800 | 1780 | 1720 | 1400 | 1810 | 1900 | 1880 | 1900 | 1300 |
| flexural modulus (× $10^4$ kg/cm$^2$, 23° C.) | 4.9 | 5.0 | 4.9 | 4.5 | 5.8 | 4.4 | 4.8 | 4.7 | 5.0 | 3.8 |
| Izod impact strength (kg · cm/cm, 23° C.) | 8.0 | 9.0 | 8.8 | 8.4 | 9.2 | 11.8 | 12.7 | 10.2 | 15.0 | 7.0 |
| melting point (°C.) | 312 | 316 | 316 | 315 | 317 | 314 | 316 | 316 | 316 | 310 |
| heat distortion temperature (°C.) | >250 | >250 | >250 | >250 | >250 | >250 | >250 | >250 | >250 | 171 |
| flexural strength retention ratio* (%, 200° C.) | 68 | 88 | 86 | 71 | 90 | 70 | 85 | 83 | 63 | 41 |
| Taber abrasion (Δmg) | 22 | 18 | 16 | 13 | 20 | 12 | 13 | 12 | 7 | 6 |
| dynamic friction coefficient | 0.59 | 0.47 | 0.47 | 0.45 | 0.49 | 0.41 | 0.41 | 0.41 | 0.41 | 0.40 |
| saturated water absorption (%, boiling water) | 1.7 | 1.4 | 1.4 | 1.7 | 1.1 | 1.6 | 1.3 | 1.3 | 1.7 | 2.1 |
| tensile strength retention ratio in saturated water absorption state (boiling water)** (%, 23° C.) | 87 | 92 | 91 | 90 | 94 | 91 | 93 | 93 | 88 | 85 |

Note
*percentage to flexural strength at 23° C.
**percentage to tensile strength at 23° C.

We claim:

1. A molding reinforced polyamide composition comprising [A] a polyamide selected from the group consisting of [A1] a polyamide composed of (a) aromatic dicarboxylic acid component units comprising 60 to 77 mole% of terephthalic acid component units and 23 to 40 mole% of aromatic dicarboxylic acid component units other than terephthalic acid component units and (b) 1,6-diaminohexane units and [A2] a polyamide composed of (a) aromatic dicarboxylic acid component units comprising 60 to 100 mole% of terephthalic acid component units and 0 to 40 mole% of aromatic dicarboxylic acid component units other than terephthalic acid component units and (b) units of a linear aliphatic alkylene-diamine component having 7 to 18 carbon atoms, and [B] a filler in an amount of 0.5 to 200 parts by weight per 100 parts by weight of said polyamide.

2. A molding polyamide composition as set forth in claim 1, wherein the aromatic dicarboxylic acid component units, other than terephthalic acid component units, constituting the polyamide are isophthalic acid component units or naphthalene-dicarboxylic acid component units.

3. A molding polyamide composition as set forth in claim 1, wherein the polyamide [A] is the polyamide [A2] and the linear aliphatic alkylene-diamine component units (b) constituting the polyamide are 1,8-diamino-octane component units, 1,10-diaminodecane component units or 1,12-diaminododecane component units.

4. A molding polyamide composition as set forth in claim 1, wherein the intrinsic viscosity ($\eta$) of the polyamide is 0.5 to 3.0 dl/g as measured in concentrated sulfuric acid at 30° C.

5. A molding polyamide composition as set forth in any one of claims 2, 4 or 3, wherein the filler [B] is a powdery filler having an average particle size of 0.1 m to 200.

6. A molding polyamide composition as set forth in claim 5, wherein the filler [B] is silica, silica-alumina, alumina, graphite, titanium dioxide, molybdenum disulfide or polytetrafluoroethylene.

7. A molding polyamide composition as set forth in claim 1, wherein the filler [B] is a fibrous filler having an average length of 0.1 to 20 mm.

8. A molding polyamide composition as set forth in claim 7, wherein the filler [B] is a wholly aromatic polyamide fiber, a glass fiber, a carbon fiber or a boron fiber.

9. A molding polyamide composition as set forth in claim 1, wherein the amount incorporated of the filler [B] is 5 to 150 parts by weight per 100 parts by weight of the polyamide.

10. A molded article formed of a polyamide composition as set forth in claim 1.

11. A sliding member formed of a polyamide composition as set forth in claim 1.

* * * * *